United States Patent [19]

Calemma et al.

[11] Patent Number: 5,248,814
[45] Date of Patent: Sep. 28, 1993

[54] PROCESS FOR PRODUCING REGENERATED HUMIC ACIDS FROM COAL

[75] Inventors: Vincenzo Calemma, San Donato Milanese; Vincenzo Piccolo, Paullo; Riccardo Rausa, San Donato Milanese, all of Italy

[73] Assignee: Eniricerche S.p.A., Milan, Italy

[21] Appl. No.: 944,041

[22] Filed: Sep. 11, 1992

[30] Foreign Application Priority Data

Sep. 13, 1991 [IT] Italy ................................ 002424

[51] Int. Cl.⁵ ............................................. C07C 65/00
[52] U.S. Cl. .................................. 562/475; 562/465; 562/478; 568/761
[58] Field of Search ................. 562/465, 475, 478; 568/761

[56] References Cited

U.S. PATENT DOCUMENTS 4,788,360 11/1988 Calemma et al. .................. 568/761

FOREIGN PATENT DOCUMENTS

| 0272737 | 6/1988 | European Pat. Off. |
|---|---|---|
| 0488459 | 6/1992 | European Pat. Off. ............ 568/761 |
| 803836 | 4/1951 | Fed. Rep. of Germany. |
| 4510723 | 4/1970 | Japan ............................ 568/761 |
| 1134334 | 6/1986 | Japan ............................ 568/761 |
| 443285 | 2/1936 | United Kingdom ............... 568/761 |
| 815568 | 7/1959 | United Kingdom ............... 568/761 |
| 1283385 | 7/1972 | United Kingdom ............... 568/761 |

OTHER PUBLICATIONS

Industrial and Engineering Chemistry, vol. 42, No. 12 (1950), pp. 2525–2529; L. D. Friedman et al., "Humic Acids From Coal".
R. S. Montgomery et al., U.S. Bureau of Miner Information Circular: "The Caustic-Oxygen Oxidation of Bituminous Coal", No. 8234, pp. 74–98 (1963).

*Primary Examiner*—Werren B. Lone
*Attorney, Agent, or Firm*—Shea & Gould

[57] ABSTRACT

Process for preparing regenerated humic acids from coal by means of the continuous oxidation on fluidized bed, characterized in that a coal of lignite, sub-bituminous or bituminous type is submitted to a preliminary oxidation under mild conditions in order to reduce the hydrogen content of said coal by an amount of 5 to 25% of hydrogen initially present in the starting coal, and that the resulting coal is subsequently submitted to an oxidation in order to produce the desired humic acids.

15 Claims, 1 Drawing Sheet

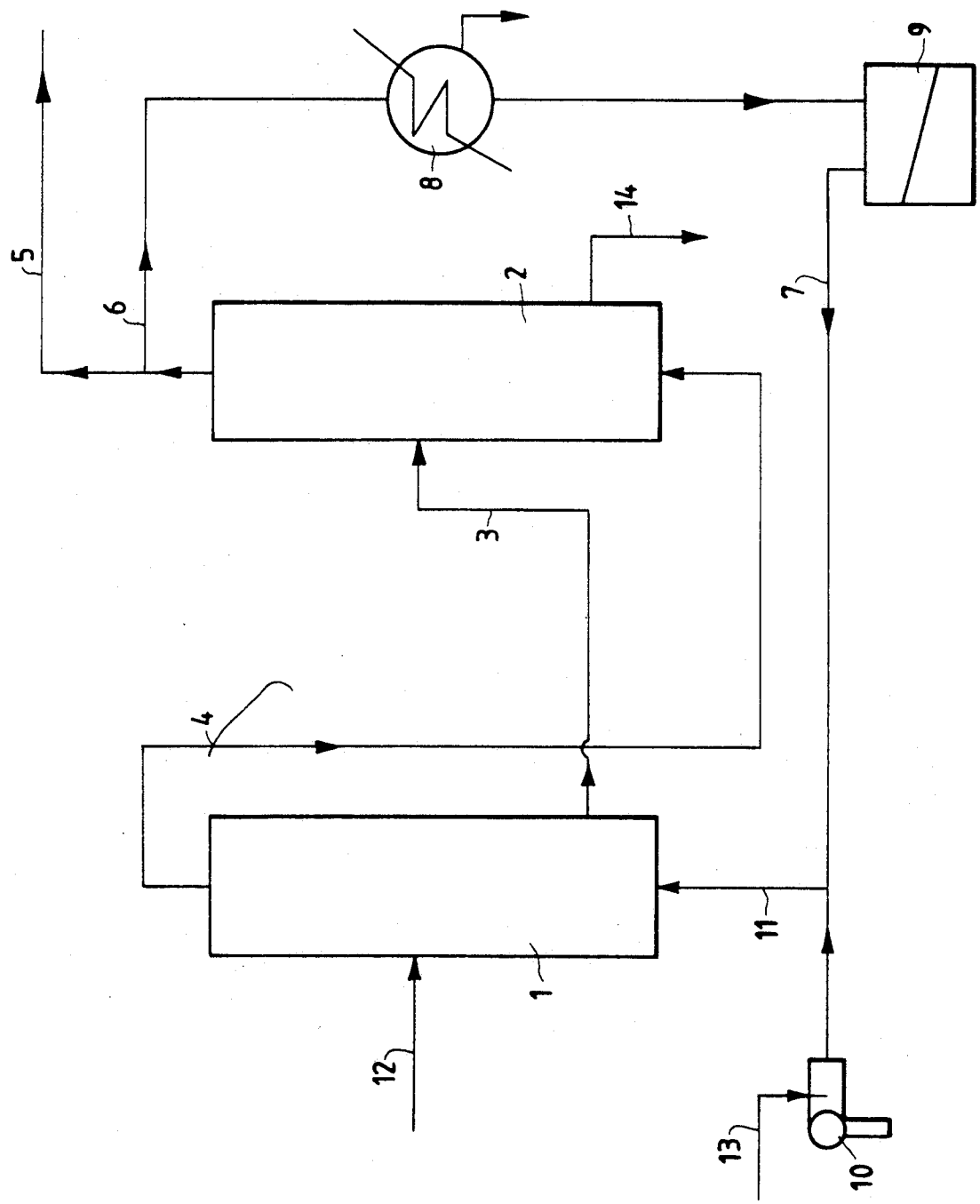

PROCESS FOR PRODUCING REGENERATED HUMIC ACIDS FROM COAL

The present invention relates to a process for producing regenerated humic acids by starting from coal by means of the dry-phase oxidation with oxygen or oxygen-nitrogen mixtures.

More particularly, the present invention relates to a process for oxidating coal, to yield humic acids, carried out in two steps.

The humic acids derived from coal oxidation can find use, as the corresponding humic acid of natural origin, either as such, or as mixtures with other known fertilizers, in the fertilization of soil.

Humic acids can also be used in order to remove metals from water.

Processes for obtaining humic acids by means of coal oxidation are known in the art. These processes can be subdivided into four general groups:
- oxidation with nitric acid or nitrogen oxides (as disclosed, e.g., in U.K. patent 1,283,385);
- oxidation with oxygen in aqueous phase with an acidic pH value (as disclosed, e.g., in Japanese patent application JP-70/10723);
- oxidation with oxygen in aqueous phase with alkaline pH value (as disclosed, e.g., in U.S. Bur. Mines Int. Circ. No. 8234, 1963, page 74);
- by means of oxygen or air in dry phase (as disclosed, e.g., in commonly assigned Italian patent No. 1,199,808.

The first three methods display several drawbacks, which can be summarized as follows.

The oxidation with nitric acid or nitrogen oxides mixtures involves the consumption of large amounts of reactants, which are rather expensive relatively to the value of the obtained product, a poor selectivity towards the formation of humic acids (ratio of humic acids to fulvic acids not higher than 4), as well as long reaction times if a coal with larger granulometry than 100 micrometers is used.

The oxidation with oxygen in aqueous phase with a basic pH value leads to low yields (of 45% at maximum), requires the consumption of large amounts of alkalies (ratio of coal to alkali=1.5-2.5), high oxygen partial pressures (20-30 abs.atm); and furthermore shows a poor selectivity towards the formation of humic acids (maximal value of ratio of humic acids to fulvic acids, by weight, comprised within the range of from 2.5 to 3) and furthermore causes the production of a large amount of $CO_2$, corresponding to 15-25% of total elemental carbon contained in the starting coal.

The oxidation with oxygen in aqueous phase with acidic pH requires the consumption of large amounts of costly reactants, and long reaction times.

The process disclosed in patent 1,198,808 makes it possible the drawbacks displayed by the processes described hereinabove, to be obviated.

The dry-phase oxidation of coal is carried out in a fluidized bed reactor using coal with a granulometry comprised within the range of from 100 micrometers to 3 micrometers, operating at a temperature comprised between 150° C. and 300° C., under an oxygen partial pressure comprised within the range of from 1.1 to 10 abs.atm, for a contact time of from 30 to 600 minutes.

Although it represents a considerable improvement over the other methods for producing humic acids, this process shows some drawbacks when is applied under high reactivity conditions with a continuously fed fluidized bed. In particular, it was observed that when the oxidation is carried out as a single-step process with a continuously fed fluidized bed, threshold values of temperature, pressure, or of combinations of these parameters exist, beyond which yields are obtained which are lower—down to 50-60%—than as expected based on the values obtained by using the procedure as reported in Italian patent 1,199,808.

The present Applicant found now that humic acids can be obtained by means of the continuous, dry-phase oxidation of coal, and, in particular, of lignites or bituminous or sub-bituminous coals, if the oxidation is carried out under such conditions of temperature and pressure as provided by Italian patent No. 1,199,808 on a coal from which an amount of hydrogen was preliminarily removed which is comprised within the range of from 5 to 25% of total hydrogen content in said coal, which may vary according to the nature of the same coal.

The Applicant believes that this percentage of removed hydrogen mainly derives from hydrogen associated with aliphatic structures, particularly reactive with $O_2$.

An example for such reactive structures are the $CH_2 <$ moieties in alpha-position to a benzene ring, or to an —OR radical.

The removal of reactive hydrogen is advantageously carried out by submitting coal to a preliminary oxidation under milder conditions of pressure, temperature and reaction time than as used for the true oxidation—which is carried out under such conditions as provided by Italian patent 1,199,808.

Therefore, the present invention relates to a process for preparing regenerated humic acids from coal by means of a continuous oxidation on fluidized bed, in which a coal of lignite, sub-bituminous or bituminous type is submitted to a preliminary oxidation under mild conditions in order to reduce the hydrogen content of said coal by an amount of from 5 to 25% of hydrogen initially present in the starting coal, and that the resulting coal is subsequently submitted to an oxidation under more severe conditions in order to produce the desired humic acids.

The preliminary oxidation to remove the active hydrogen content can be carried out at temperatures comprised within the range of from 150° to 200° C., with a contact time comprised within the range of from 10 to 120 minutes, and under a partial pressure of oxygen comprised within the range of from 0.21 to 6 abs.atm. In any case, the operating conditions for preliminary oxidation will be selected in such a way that the amount of hydrogen contained in starting coal will be reduced by an amount comprised within the range of from 5 to 25%.

The oxidation of pre-treated coal will advantageously be carried out at a temperature comprised within the range of from 180° to 300° C., with a contact time comprised within the range of from 30 to 600 minutes, and under a partial pressure of oxygen comprised within the range of from 0.21 to 6 abs.atm.

The selection of most suitable operating conditions (i.e., temperature, oxygen partial pressure, contact time) are dictated by the nature of coal to be treated, and by the granulometry thereof. More severe conditions will generally be required for higher-quality coals and larger granulometries. Advantageously, also the step of preliminary oxidation of coal to reduce the hydrogen content thereof is carried out by means of a continuous process on fluidized bed.

In order to accomplish the process according to the present invention, the flow scheme reported in the FIGURE can advantageously be used.

In particular, good results are obtained when measures are adopted in order that a portion of air or oxygen leaving the oxidation reactor inside which humic acids are produced according to as provided for and claimed in co-pending patent application (European Pat. Public. No. 0 488 459), is recycled to the reactor inside which the preliminary oxidation is carried out.

In the FIGURE the reference numeral 1 indicates the preliminary oxidation reaction vessel, 2 represents the end oxidation reaction vessel, 9 represents the compressor for gas recycle, 10 is the compressor for oxygen or air make-up.

The process of the present invention can be schematically disclosed as follows:

Coal is continuously charged to the reactor for preliminary oxidation 1 through the line 12. Through the line 11, pressurized air is fed together with the recycled gases from the second reactor 2. To the reactor 2 the gases and pre-oxidized coal are respectively fed through the lines 4 and 3. From the reactor 2 the oxidized coal—from which humic acids are extracted according to the methodology as disclosed in Italian patent No. 1,199,808—leaves through line 14, and the gases containing carbon monoxide, carbon dioxide, nitrogen and oxygen excess leave through lines 5 and 6. An aliquot of these gases is recycled through line 7 to the preliminary oxidation reaction vessel 1, after being cooled in heat exchanger 8.

The following examples illustrate the invention, but shall not be construed as being limitative thereof.

EXAMPLE 1

Sub-bituminous coal Montana Rosebud having a granulometry comprised within the range of from 200 to 600 micrometers and a hydrogen content of 4.66%, dry basis, and free from ashes (DAF) was oxidized by using two different procedures.

In the first case, said coal was reacted, on a fluidized bed reactor, which was continuously fed, under the following experimental conditions:

| | |
|---|---|
| Oxygen partial pressure | 1.47 kg/cm$^2$ |
| Temperature | 200° C. |
| Fluidizing velocity | 29 cm/second |
| Coal feed flowrate | 3.7 kg/hour |
| Average stay time | 8.9 minutes | and, in the second case, the oxidation, under the above exposed conditions, was carried out on Montana Rosebud coal which was previously oxidized under the following experimental conditions:

| | |
|---|---|
| Oxygen partial pressure | 1.47 kg/cm$^2$ |
| Temperature | 170° C. |
| Fluidizing velocity | 29 cm/second |
| Coal feed flowrate | 33 kg/hour |
| Average stay time | 60 minutes |

The content of humic acids in oxidized coal was of 42% in the case of the oxidation carried out in one single step, and of 68% when the oxidation was carried out in two steps.

One should bear in his mind that the content of humic acids in coal oxidized at 170° C. is nearly identical to the content of humic acids in pristine coal, with values respectively of 19% and 13%.

The hydrogen content in coal oxidized at 170° C. was of 4.14% (DAF), with a decrease of 11% relatively to the starting coal.

EXAMPLE 2

A sample of North Dakota Lignite having a granulometry comprised within the range of from 250 to 500 micrometers and a hydrogen content of 4.95%, dry basis, and free from ashes (DAF) was oxidized by using two different procedures.

In the first case, said Lignite was reacted, on a fluidized bed reaction vessel, which was continuously fed, under the following experimental conditions:

| | |
|---|---|
| Oxygen partial pressure | 1.26 kg/cm$^2$ |
| Temperature | 190° C. |
| Fluidizing velocity | 29 cm/second |
| Coal feed flowrate | 3.7 kg/hour |
| Average stay time | 8.9 | and, in the second case, the oxidation, under the above exposed conditions, was carried out on a sample of North Dakota Lignite which was previously oxidized under the following experimental conditions:

| | |
|---|---|
| Oxygen partial pressure | 1.26 kg/cm$^2$ |
| Temperature | 160° C. |
| Fluidizing velocity | 29 cm/second |
| Coal feed flowrate | 25 kg/hour |
| Average stay time | 80 minutes |

The content of humic acids in oxidized coal was of 49% in the case of the oxidation carried out in one single step, and of 68% when the oxidation was carried out in two steps.

One should bear in his mind that the content of humic acids in the Lignite oxidized at 160° C. is nearly identical to the content of humic acids in pristine coal, with values respectively of 25% and 28%.

The hydrogen content in the coal oxidized at 170° C. was of 4.50% (DAF), with a decrease of 9% relatively to the starting coal.

EXAMPLE 3

A sample of Illinois No. 6 coal (a bituminous coal) having a granulometry comprised within the range of from 250 to 500 micrometers and a hydrogen content of 5.11%, dry basis, and free from ashes (DAF) was oxidized by using two different procedures.

In the first case, said coal was reacted, on a fluidized bed reactor which was continuously fed, under the following experimental conditions:

| | |
|---|---|
| Oxygen partial pressure | 1.0 kg/cm$^2$ |
| Temperature | 250° C. |
| Fluidizing velocity | 25 cm/second |
| Coal feed flowrate | 3.7 kg/hour |
| Average stay time | 9 hours | and, in the second case, the oxidation, under the above exposed conditions, was carried out on a sample of Illinois No. 6 coal which was previously oxidized under the following experimental conditions:

| | | |
|---|---|---|
| Oxygen partial pressure | 0.42 | kg/cm² |
| Temperature | 200° | C. |
| Fluidizing velocity | 25 | cm/second |
| Coal feed flowrate | 24 | kg/hour |
| Average stay time | 90 | minutes |

The content of humic acids in oxidized coal was of 58% in the case of the oxidation carried out in one single step, and of 70% when the oxidation was carried out in two steps.

One should bear in his mind that the content of humic acids in coal oxidized at 200° C. is nearly identical to the content of humic acids in pristine coal, with values respectively of 3% and 5%.

The hydrogen content in coal oxidized at 200° C. was of 4.44% (DAF), with a decrease of 13% relatively to the starting coal.

We claim:

1. A process for preparing regenerated humic acids from lignite, sub-bituminous or bituminous type coal which comprises the steps of (a) preliminarily oxidizing the coal with oxygen under mild conditions in order to reduce the coal's hydrogen content by an amount of from 5 to 25% of the hydrogen initially present in the starting coal, and (b) subsequently continuously oxidizing the preliminarily oxidized coal on a fluidized bed with oxygen under more severe conditions to produce the regenerated humic acids.

2. A process for preparing humic acids according to claim 1, wherein step (a) is carried out at a temperature within the range of from 150° to 200° C.

3. A process for preparing humic acids according to claim 1, wherein step (a) is carried out with a contact time within the range of from 10 to 120 minutes.

4. A process for preparing humic acids according to claim 1, wherein step (a) is carried out under a partial pressure of oxygen within the range of from 0.21 to 6 abs.atm.

5. A process for preparing humic acids according to claim 1, wherein step (b) is carried out at a temperature within the range of from 180° to 300° C.

6. A process for preparing humic acids according to claim 1, wherein step (b) is carried out with a contact time within the range of from 30 to 600 minutes.

7. A process for preparing humic acids according to claim 1, wherein step (b) is carried out under a partial pressure of oxygen within the range of from 0.21 to 10 abs. atm.

8. A process for preparing humic acids according to claim 1, wherein step (a) is carried out by continuously oxidizing the coal with oxygen on a fluidized bed.

9. A process for preparing humic acids according to claim 1, wherein a portion of gases coming from step (b) are recycled to a reaction vessel inside which step (a) is being carried out.

10. The process according to claim 1, wherein step (a) is carried out at a temperature within the range of from 150° to 200° C. with a contact time within the range of from 10 to 120 minutes under a partial pressure of oxygen within the range of from 0.21 to 6 abs.atm.

11. The process according to claim 1, wherein step (a) is carried out at a temperature within the range of from 180° to 300° C. with a contact time within the range of from 30 to 600 minutes under a partial pressure of oxygen within the range of from 0.21 to 10 abs.atm.

12. The process of claim 11, wherein the partial pressure of oxygen is within the range of from 0.21 to 6 abs.atm.

13. The process according to claim 8, wherein step (a) is carried out at a temperature within the range of from 150° to 200° C. with a contact time within the range of from 10 to 120 minutes under a partial pressure of oxygen within the range of from 0.21 to 6 abs.atm.

14. The process according to claim 1, wherein step (a) is carried out at a temperature within the range of from 150° to 200° C. with a contact time within the range of from 10 to 120 minutes under a partial pressure of oxygen within the range of from 0.21 to 6 abs.atm. and wherein step (b) is carried out at a temperature within the range of from 180° to 300° C. with a contact time within the range of from 30 to 600 minutes under a partial pressure of oxygen within the range of from 0.21 to 10 abs.atm.

15. The process according to claim 8, wherein step (a) is carried out at a temperature within the range of from 150° to 200° C. with a contact time within the range of from 10 to 120 minutes under a partial pressure of oxygen within the range of from 0.21 to 6 abs.atm. and wherein step (b) is carried out at a temperature within the range of from 180° to 300° C. with a contact time within the range of from 30 to 600 minutes under a partial pressure of oxygen within the range of from 0.21 to 10 abs.atm.

* * * * *